Feb. 22, 1966   N. F. BROWN   3,236,544
FLEXIBLE COUPLING
Filed Dec. 2, 1963   4 Sheets-Sheet 1
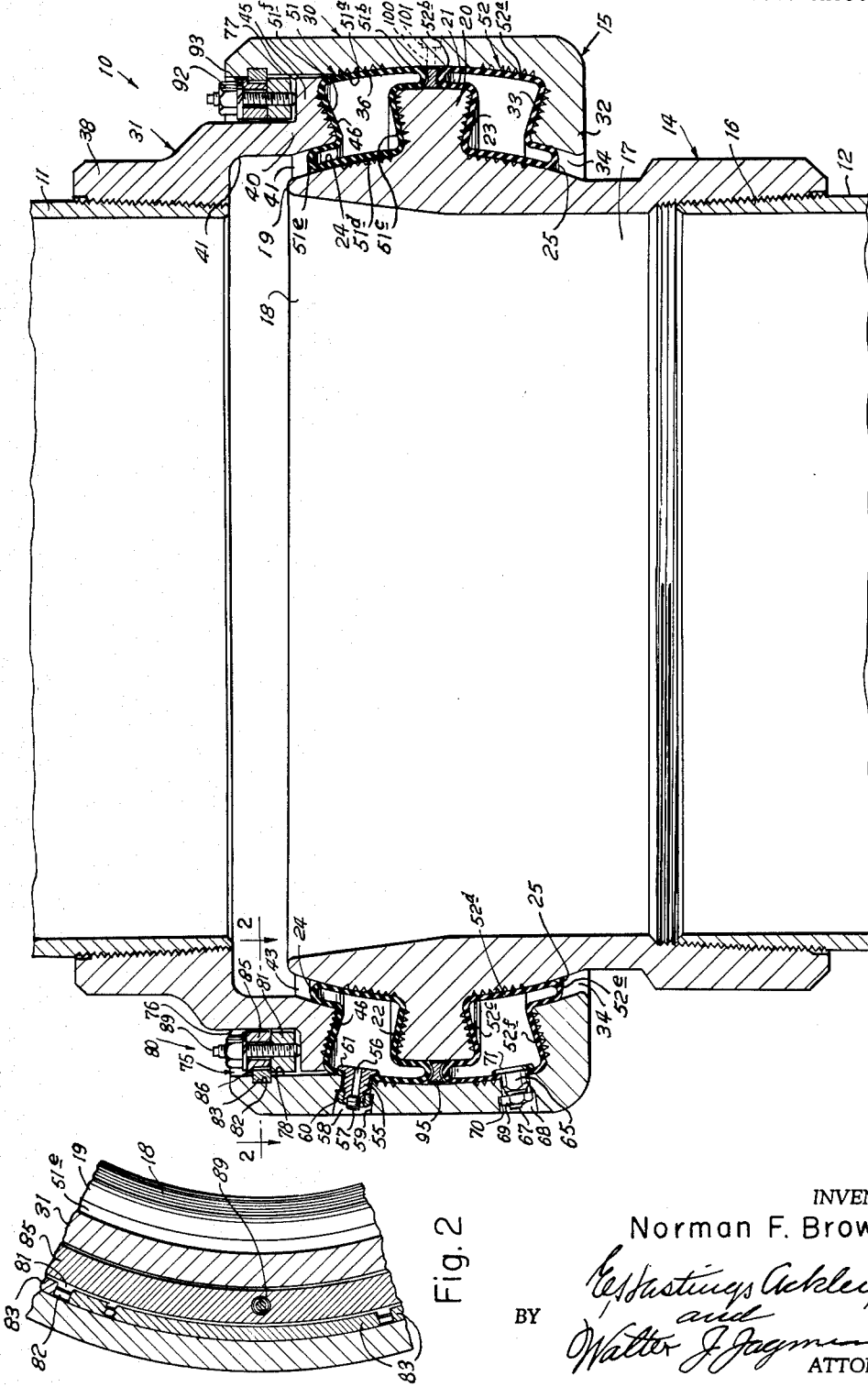
INVENTOR
Norman F. Brown
BY Hastings Ackley
and Walter J. Jagmin
ATTORNEYS

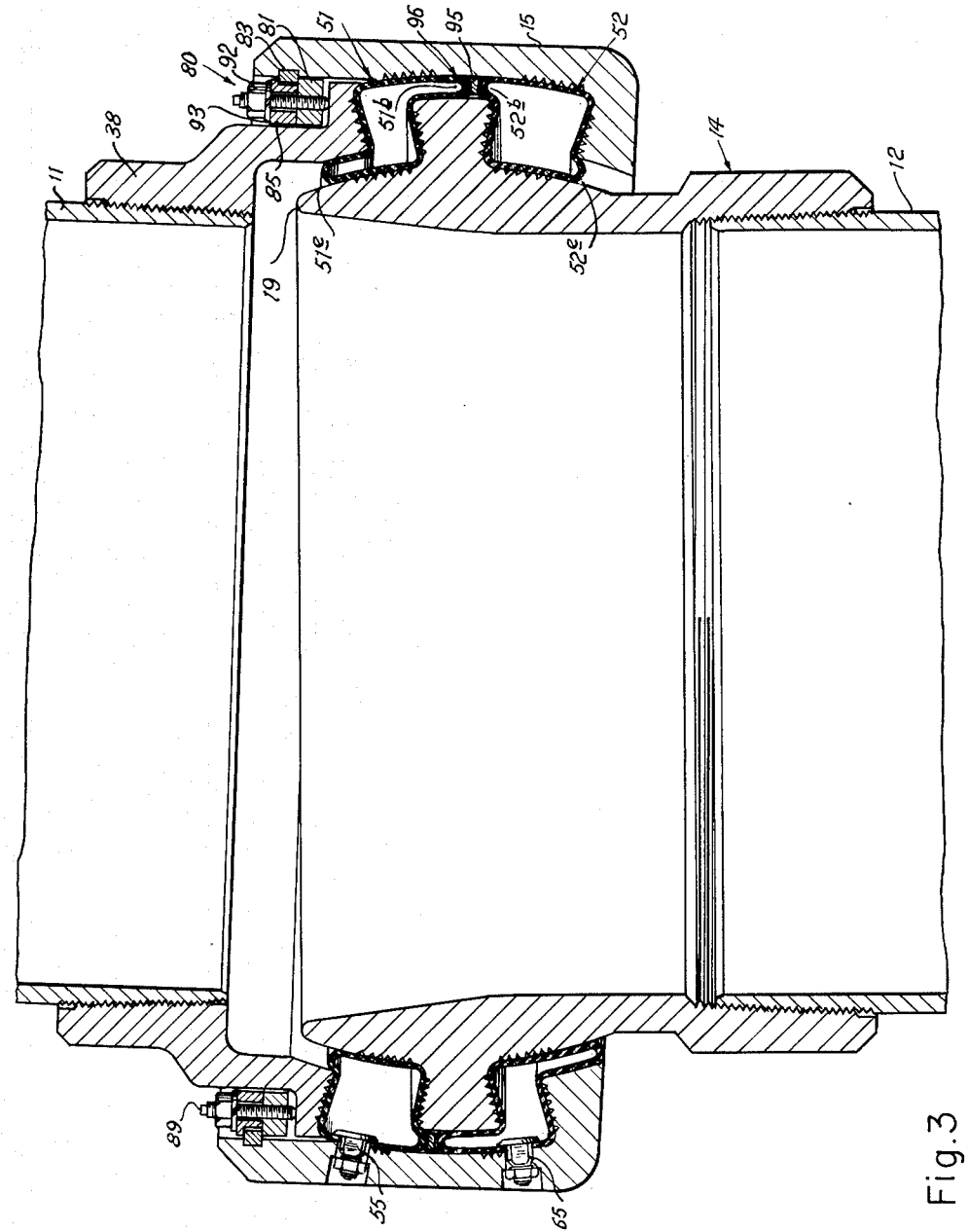

United States Patent Office 3,236,544
Patented Feb. 22, 1966

3,236,544
FLEXIBLE COUPLING
Norman F. Brown, Dallas, Tex., assignor to Otis Engineering Corporation, Dallas, Tex., a corporation of Delaware
Filed Dec. 2, 1963, Ser. No. 327,416
7 Claims. (Cl. 285—97)

This invention relates to couplings and more particularly to a coupling for connecting tubular members for limited pivotal movement relative to one another.

An object of this invention is to provide a new and improved coupling for connecting two tubular members or flow conductors in fluid tight relationship which permits limited universal pivotal movement of one tubular member relative to the other.

Another object is to provide a coupling which permits one tubular member to be moved pivotally relative to the other by a relative small force regardless of the magnitude of the force exerted on the members tending to move the two members toward or away from one another.

Still another object is to provide a coupling having two complementary telescoped members movable pivotally relative to one another and having means for uniformly distributing forces tending to move the two members in opposite directions over the load bearing surfaces of the two coupling members.

Still another object is to provide a coupling wherein the means for uniformly distributing the force or load over the load bearing surfaces of the two coupling members includes a hollow flexible annular load member interposed between spaced opposed load bearing surfaces of the two coupling members which is filled with a fluid which transmits the load or force uniformly over the bearing surfaces.

A further object is to provide a new and improved coupling having an inner annular member provided with an external annular flange and an outer tubular member telescopable over the inner annular member and having an internal annular recess in which the external flange of the inner member is receivable, the coupling having a pair of annular flexible hollow load rings or members filled with incompressible fluid disposed on opposite sides of the annular flange holding the annular flange out of engagement with the outer member whereby expansion and contraction of diametrically opposite portions of the annular load members upon pivotal movement of one coupling member relative to the other and the movement of the fluid from the contracted portions to the expanded portions permits pivotal movement of the coupling members relative to one another and the fluid applies the load or forces tending to move one coupling member toward or away from the other coupling member uniformly over the load bearing surfaces of the two coupling members.

A still further object is to provide a coupling which is operable to permit pivotal movement of the coupling members relative to one another and provides a fluid tight seal therebetween even upon the rupture of one or both of the flexible load members.

A still further object is to provide a flexible coupling having means permitting substantially frictionless movement of one coupling member relative to the other which is capable of sustaining compressional and tensile strains and stresses of great magnitudes.

Additional objects and advantages of the invention will be readily apparent from the reading of the following description of a device constructed in accordance with the invention, and reference to the accompanying drawings thereof, wherein:

FIGURE 1 is a vertical sectional view of a flexible coupling embodying the invention;

FIGURE 2 is a fragmentary sectional view taken on line 2—2 of FIGURE 1;

FIGURE 3 is a vertical sectional view of the flexible coupling showing one coupling member and the tubular member or flow conductor connected thereto pivoted out of longitudinal axial alignment with the other coupling member and the tubular member or flow conductor connector connected thereto;

Figure 4:
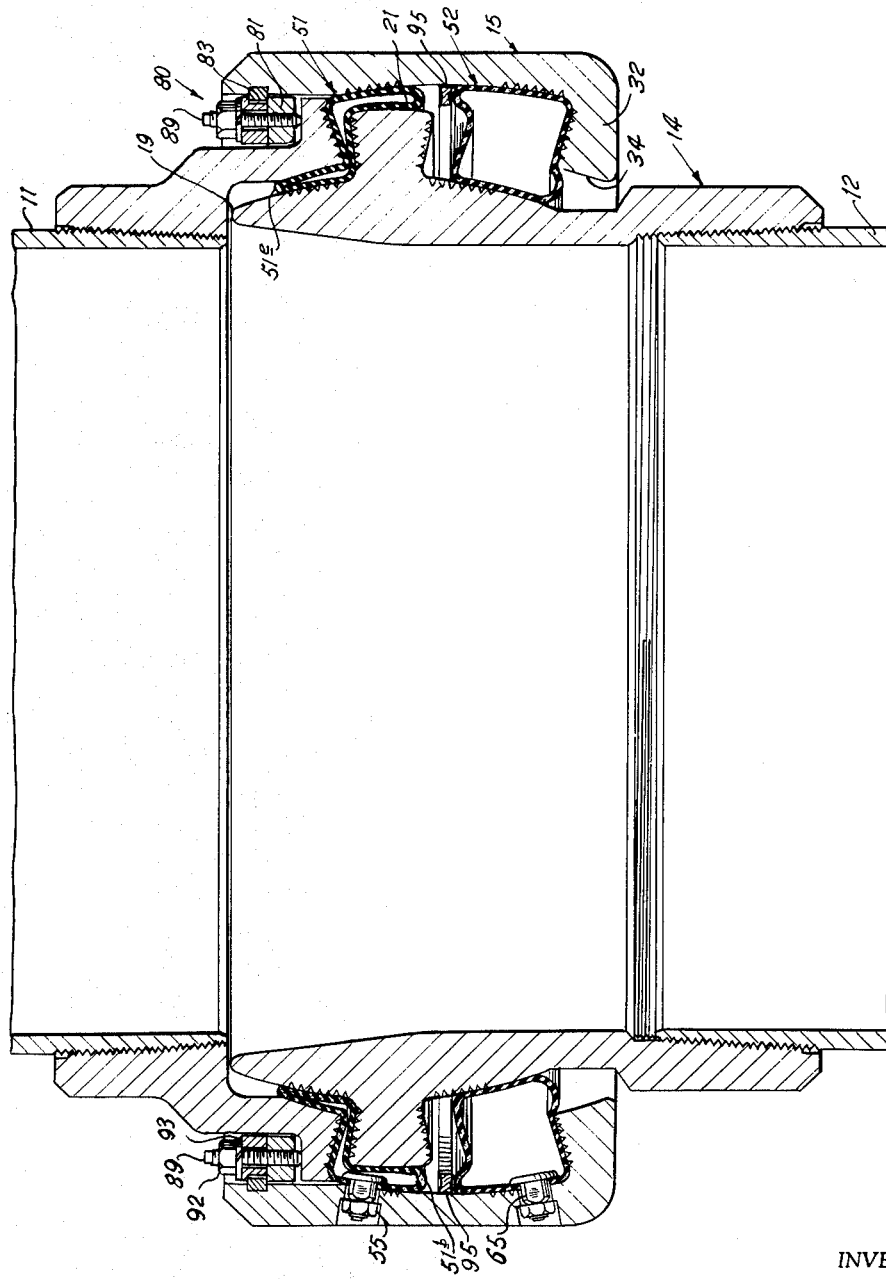
FIGURE 4 is a vertical sectional view showing the position of the two coupling members when one of the hollow load members has ruptured and the fluid previously filling it has escaped therefrom; and, FIGURE 5 is a vertical sectional view of a modified form of the flexible coupling embodying the invention.

Referring now to the drawings, the flexible coupling 10, which connects adjacent ends of a pair of tubular members or flow conductors 11 and 12 for limited universal pivotal movement relative to each other, includes a tubular inner member 14 secured to the flow conductor 12 and an outer tubular member 15 telescoped over the inner member and secured to the end of the tubular member 11. The lower end portion of the bore or longitudinal passage of the inner coupling member is enlarged as at 16 and the upper end portion of the tubular member 12 is threaded therein. The intermediate portion 17 of the passage of the inner member is of substantially the same diameter as the internal diameters of the tubular members 11 and 12 while its upper end portion is defined by the annular upwardly and outwardly beveled surface 18 so that the top annular surface 19 of the inner member is disposed outwardly of the internal surfaces of the lower end of the tubular member 11 regardless of the pivoted position of the outer coupling member relative to the inner coupling member in order that objects may be moved downwardly through from the tubular member 11 into the tubular member 12 through the coupling without engaging or hanging on the top annular surface of the inner coupling member. The inwardly convergent surface 18 serves as a guide or cam surface to direct any objects passing therethrough into the upper end of the lower flow conductor 12.

The inner coupling member has an external annular flange 20 whose outer arcuate surface 21 is spherical and whose upper and lower surfaces 22 and 23 diverge outwardly from the upper and lower outer spherical surfaces 24 and 25 respectively, of the member. The arcuate or spherical surfaces 21 and the surfaces 24 and 25 have a common center of curvature, the radii of curvature of the surfaces 24 and 25 being equal while the radius of curvature of the surface 21 is greater than the radii of curvature of the surfaces 24 and 25.

The outer coupling member 15 includes a collar section 30 and a connector section 31. The collar section 30 has an internal annular bottom flange 32 whose top surface 33, when the coupling members are in their normal or axial aligned position, illustrated in FIGURE 1, extends upwardly and inwardly in spaced relation to the lower surface 23 of the external flange 20, the surfaces 23 and 43 extending divergently outwardly relative to each other. The inner annular surface 34 of the bottom flange is spherical and extends parallel to and spaced from the lower spherical surface 25 of the inner coupling member. The internal surface 36 of the collar section 30 extending upwardly from the bottom flange 32 thereof is also spherical and disposed in parallel spaced relation to the spherical surfaces of the inner tubular coupling member.

The connector section 31 of the outer tubular member 15 has an upper internally threaded portion 38 in which is secured the lower threaded end portion of the upper tubular member or flow conductor 11. The connector section 31 has an enlarged lower portion 40 whose bore or passage 41 is enlarged to receive the upper end portion of the inner coupling member and to provide clearance between the upper end portion of the inner coupling member and the outer coupling member during pivotal or flexing movement of the coupling members relative to one another. The connector section has an internal spherical surface 43 which extends in spaced parallel relation to the upper arcuate spherical surface 24 of the inner coupling member. The external annular bottom flange 45 of the connector section 31 is telescopable in the upper end of the collar section and has a bottom annular upwardly and outwardly extending surface 46 which is spaced from the upper annular surface 22 of the external flange 20 when the two coupling members are in longitudinal axial alignment the two surfaces 22 and 46 extending divergently outwardly relative to each other.

The internal spherical surfaces of the outer coupling member and the external spherical surfaces of the inner coupling member all have a common center of curvature which lies in common central longitudinal axis of the two coupling members when they are in longitudinal alignment, FIGURE 1, whereby the two coupling members are pivotable relative to each other about any axis perpendicular to the common longitudinal axis which intersects the longitudinal axis and passes through the common center of curavture of the spherical surfaces and whereby all opposed internal and external spherical surfaces of the inner and outer members are always spaced apart the same distances and parallel to one another regardless of the angular or pivotal position of one coupling member to the other.

The two coupling members are held in centered uniformly annularly spaced relationship by a pair of annular flexible hollow load members 51 and 52 disposed between the facing annular shoulders or surfaces 46 and 33 of the outer coupling member and above and below, respectively, the external flange 20 of the inner coupling member. The load members are formed of a suitable flexible somewhat resilient substance such as neoprene, and the like, having laminations of "Dacron" canvas or the like molded therein in such manner that the load members are flexible in any direction but are resilient or elastic only circumferentially and are not resilient or elastic cross sectionally whereby the cross sectional radius of each load member when it is fully expanded and therefore circular in cross sectional configuration cannot be increased by any force or pressure which may be exerted thereon by the pressure of the fluid filling the bottom load member. As a result the volume or capacity of each load member when it is confined between the coupling members and held thereby against circumferential expansion, is constant and no portion thereof may expand cross sectionally if another portion is subjected to a force tending to compress it.

The upper load member 51 has an outer annular portion 51a which engages the internal arcuate surface 36 of the collar section, an outer annular tongue or fold portion 51b which extends between and engages the spaced spherical surfaces 36 and 21, a lower portion 51c which engages the upper annular surface 22 of the external flange, an inner annular portion 51d which engages the upper spherical surface 24 of the inner coupling member and an upper annular tongue or fold portion 51e which extends between and engages the spaced spherical surfaces 24 and 43, and an upper annular portion 51f which engages the downwardly facing annular surface 46 of the connector section 31 of the outer coupling member. The portions of the surfaces of the coupling members engaged by the portions 51a, 51c, 51d and 51f of the load member may be grooved or scarified, to cause these portions of the load member to be gripped and held against movement relative to the surfaces of the coupling members engaged thereby. The spherical surfaces of the coupling members between which the fold or tongue portions 51b and 51e of the coupling members extend and which they engage are smooth to facilitate rolling movement of these fold or tongue portions of the load member thereover during pivotal movement of the coupling members.

If desired, of course, the portions 51a, 51c, 51d and 51f may be bonded or adhesively secured to the surfaces of the coupling members which they engage.

The load member 51 has a suitable inlet fitting 55 secured thereto whose passage 56 opens into the interior of the load member and which is closable by a suitable closure or plug 57 threaded in its enlarged outer end. The inlet fitting extends outwardly into a lateral bore 58 of the collar section and has a nut 59 threaded on its outer end which engages the annular shoulder 60 provided by an enlargement of the lateral bore to rigidly secure the fitting to the collar section, the inlet fitting having an inner external flange 61 of greater radius than the inner portion of the lateral bore 58 which compresses the portions of the load member disposed between the flange 61 and the internal surfaces of the collar section. An incompressible fluid such as oil, grease and the like is introduced into the load member through the inlet fitting.

The lower load member 52 similarly has an outer portion 52a which engages the internal arcuate surface 36 of the coupling collar, an outer annular upper fold or tongue portion 52b which extends upwardly between and engages the spherical surfaces 21 and 36 of the inner and outer coupling members, an upper annular portion 52c which engages the lower annular surface 23 of the external flange 20 of the inner coupling member, an inner annular portion 52d which engages the lower spherical surface 25, an inner annular fold or tongue portion 52e which extends between and engages the spherical surfaces 25 and 34 of the inner and outer coupling members, and a lower annular portion 52f which engages the upper surface 33 of the flange 32 of the collar section 30. The surfaces of the coupling members engaged by the portions 52a, 52c, 52d and 52f of the load member may be grooved or scarified to cause these portions of the lower load member to be held against movement relative to these surfaces. The spherical surfaces of the coupling members engaged by the outer and inner tongue or fold portions 52b and 52e, however, are not provided with such grooves or serrations in order that these portions of the lower load member may move relative to these surfaces without resistance.

If desired, of course, the portions 52a, 52c, 52d and 52f may be bonded or adhesively secured to the surfaces of the coupling members engaged thereby.

The load member 52 is provided with a fitting 65, identical with the fitting 55, whose passage is closed by a plug 67 threaded therein and which extends outwardly in the lateral bore or aperture 68 of the collar section 30. The inlet fitting 65 is secured to the collar section by means of a nut 69 threaded on its outer end which engages the shoulder 70 of the collar section and its inner external annular flange 71.

The two sections 30 and 31 of the outer coupling member 15 provide an annular upwardly opening space or recess 75 defined by the outer external surface 76 of the connector section, the upper surface 77 of the external bottom flange 45 thereof, and the internal annular surface 78 of the collar section which extends upwardly from the upper end of the internal spherical surface 36 thereof. A retainer assembly 80 is positioned in the recess 75 and includes a clamp ring 81 positioned in the annular upwardly opening recess below an internal annular recess 82 of the collar section in which are receivable or positionable the outer portions of a plurality of ring segments 83 whose inner portions extend or protrude inwardly into the annular recess 75 and engage the upper surface of the clamp ring to prevent its upward movement. The lock ring 85 is telescoped into the ring segments to prevent their inward movement and is preferably provided with an external annular top flange 86 which engages the upper surfaces of the ring segments. The lock ring is rigidly securable to the clamp ring by a plurality of circumferentially spaced adjusting screws 89 which extend through suitable apertures in the lock ring 85 and through threaded bores of the clamp ring 81 with their lower ends engaging the top shoulder or surface 77 of the external flange 45. The adjusting screws 89 are rigidly secured in adjusted positions on the clamp ring by means of the nuts 92 threaded on their upper end portions and the lock washers 93 interposed between the nuts and the upper surface of the lock ring 85. The adjusting screws also cooperate with the nuts and the clamp ring to secure the ring segments, the lamp ring and lock ring rigidly to one another. An annular floating ring 95 may be interposed between the spherical surfaces 21 and 36 of the inner and outer tubular members and between the upper and lower outer fold or tongue portions 51b and 52b of the upper and lower load members 51 and 52 to separate and support the outer fold portions of the two load members. The floating ring 95 is movable relative to the two spherical surfaces and may tilt about the center of curvature of the spherical surfaces as the two coupling members are moved out of longitudinal alignment or are pivoted relative to one another.

The coupling 10 is assembled by positioning the lower load member 52, filled with grease, oil or other incompressible liquid or fluid, and with its inlet fitting 65 closed into the collar section 30 until it rests on the bottom flange 32 and securing the inlet fitting in the port 68. The floating ring is then placed in the coupling section on the load member 52. The inner coupling member 14 is then telescoped downwardly into the collar section and through the floating ring and the lower load member 52. The upper load member, also filled with grease, oil or the like, is then positioned between the inner coupling member and the collar section above the external annular flange of the inner coupling member and its inlet fitting 50 is positioned in the lateral bore 58 and secured therein by the nut 59. The connector section 31 is then telescoped downwardly into the collar section. The clamp ring 81 is next placed in the upwardly opening recess or annular space 75 and the ring segments 82 are inserted into the recess 75 and moved outwardly until their annular outer portions extend in the internal annular recess 82 of the connector section. The locking ring 85 is then positioned in the recess and extends inwardly of the ring segments to prevent their inward movement. The adjusting screws 89 are next inserted through the apertures in the lock ring and threaded in the threaded bores of the clamp ring until their lower ends extend downwardly of the clamp ring and engage the upper surface 77 of the external flange 45 of the connector section. The plugs 57 and 67 are then removed from the fittings 55 and 65, respectively, and the adjusting screws are rotated to move the collar section downwardly and position the external annular flange of the inner coupling member 14 substantially centrally in the internal annular recess 96 of the outer coupling member 15 defined by the upper and lower longitudinally spaced annular surfaces 33 and 46 and the spherical surface 36. As the connector section is moved downwardly into the collar section, excess liquid and any gas in the load members are expelled through the fittings 55 and 65. The passages of the inlet fittings are closed by their plugs 56 and 57 when the external flange is properly positioned in the internal recess and the liquid in the load members is then placed under a small pressure by causing the connector section to be moved further downwardly a very small distance into the collar section by means of the adjusting screws in order that under normal condition with the coupling members in axial alignment, the load members will sealingly engage the various surfaces of the two coupling members. The engagement of the clamp ring with the bottom surfaces of the ring segments 83 limits its upward movement in the recess. The adjusting screws are rigidly secured in their adjusted position relative to the clamp ring by means of the nuts 92 and the lock washers 93. The adjusting screws and nuts also rigidly secure the lock ring to the clamp ring and the ring segments whereby the screws are rigidly held in such adjusted position relative to the coupling sections and all elements of the retainer assembly 80 are held against any movement relative to each other and to the coupling members. The tubular members or flow conductors 11 and 12 may then be connected to the connector section 31 and the inner coupling member 14.

If a force is now exerted on the two flow conductors tending to move them longitudinally toward each other, as for example by exerting a downward force on the upper flow conductor 11, such load or force places the liquid in the upper load member under pressure and the liquid transmits or applies such force or load uniformly to all surfaces of the two coupling members engaged by the external surfaces of the upper load member. Since only the inner and outer tongue or fold portions 51b and 51e, respectively, of the upper load member are now free to move relative to the coupling members and since the force or pressure per unit area exerted on the flexible load member by the liquid therein is equal at all areas of the load member, the upper load member and the liquid therein hold the outer coupling member properly centered relative to the inner member and against downward movement relative to the inner member. The liquid in the lower load member is not subjected to any load.

Conversely, if a force is exerted on one or the other of the flow conductors tending to move them apart, such tensile force or load is borne by the liquid in the lower load member 52 which transmits or applies such tensile force or load uniformly to all load bearing surfaces of the two coupling members engaged by the lower load member. The load member whose liquid is under a load pressure also seals between the coupling members so that the coupling provides a fluid tight connection between the two tubular members.

The coupling 10 permits pivotal movement of one flow conductor relative to the other since the tongue portions of the load members may deform or flex as required as the two coupling members pivot relative to one another. For example, if the upper flow conductor 11 is pivoted to the right or clockwise as seen in FIGURE 3, about a horizontal axis in which lies the common center of the curvature of the spherical surfaces of the two coupling members, the cross-sectional area of the interior of the right hand portions of the upper load member is decreased while simultaneously the cross-sectional area of the interior of the left hand portions of the upper load member is increased as the fluid moves freely from the right hand portion to the left hand portion thereof. During such pivotal movement, the upper surface 46 of the right hand portion or half of the outer coupling member moves toward the upper surface 22 of the right hand portion or half of the external flange 20 of the inner coupling member and simultaneously the upper surface 46 of the left hand portion or half of the outer coupling member moves away from the upper surface 22 of the left hand portion or half of the inner coupling member. The tongue or fold portions 51b and 51e roll or flex relative to the spherical surfaces of the coupling members engaged thereby to permit such contraction of the right hand portions of the upper load member and such expansion of the left hand portions thereof, it being apparent that during such pivotal movement, the length of the tongue portions 51b and 51e at the right hand side or half of the coupling increases while their lengths decrease at the left hand portion or half of the coupling. As the tongue portions of the load members move relative to the spherical surfaces they engage, their circumferences must change slightly and this is made possible by the circumferential elasticity of the load members. The separator ring 95 is free to tilt about the center of curvature of the spherical surfaces and thus does not hinder or obstruct contraction or expansion of these two half portions of the upper load member. Simultaneously, the cross sectional area of the right hand portion or half of the lower load member 52 expands and the cross-sectional area of the left hand portion or half of the lower load members decreases.

If the two tubular members are now under a load or force tending to move them toward each other, the load is borne by the fluid within the upper load member which transmits the load uniformly to all bearing surfaces contacted or engaged by the upper load member since the liquid in the upper load member is necessarily at the same pressure in all portions of the upper load member. The load member thus holds the two coupling members properly centered relative to one another regardless of their pivotal or angular positions relative to one another.

If the two flow conductors 11 and 12 are subjected to a force tending to move them longitudinally away from one another, the load is borne by the lower load member 52, such force causing the relatively incompressible liquid in the lower load member to be placed under pressure, the force therefore exerted through the lower load member 52 to the surfaces of the coupling members engaged by the lower load member holds the two coupling members properly centered relative to one another and such load is transmitted or applied uniformly to all bearing surfaces of the two coupling members which are engaged by the lower load member.

The annular ring or load members are very strong and can withstand a very great load. For example, a flexible coupling 10 used to connect tubular members or flow conductors which are 20 inches in diameter, has load members or rings which are easily capable of withstanding loads of sixty thousand pounds tending to move the flow conductors 11 and 12 toward or away from one another.

Since the pressure within the tubular load members is uniform regardless of the pivotal position of one coupling member relative to another, the two coupling members are easily flexed or pivoted relative to one another in any direction about the common center of curvatures of their spherical surfaces regardless of the load tending to move them in either longitudinal direction relative to one another. A minimum of friction exists between all contacting or moving surfaces of the flexible members said fold or tongue portions of the flexible members merely flex or roll along the spherical surfaces which they engage during pivotal movement of one coupling member relative to the other.

The flexible coupling 10 may be used in any application where low friction flexibility between two tubular members or flow conductors under great loads is required at the location of their connection. For example, the coupling 10 may be used in submarine well drilling for connecting sections of a string of casing which extends from a drilling barge to a casing head on the ocean floor to accommodate movement of such barge relative to the casing head due to wave motion and the like. In this case, the lower end of the string of casing would be connected to a suitable extension of the casing head adjacent the ocean floor by means of one flexible coupling 10 and a second such flexible coupling would connect two sections of the casing at or just below the barge.

The flexible coupling 10, as illustrated, has a limited flexibility or deflection, approximately seven degrees in opposite directions or a total of fourteen degrees. Greater flexibility could be provided in the coupling but would very likely prevent the free passage of tools therethrough. If a greater degree of deflection of the casing between the barge and the casing head at the bottom of the ocean floor is desired, any number of such flexible couplings can be provided in the string of casing between and connecting adjacent sections of the casing to provide such greater degree of flexibility or total deflection of the casing between the barge and the casing head.

In the event that one of the load members for example, the upper load member 51, ruptures and permits the liquid contained therein to escape therefrom, the coupling is still operable since such rupture merely frees the outer coupling member for downward movement relative to the inner coupling member to the position illustrated in FIGURE 4 wherein the lowermost inner annular portion 51f of the load member engages the portion 51c and the external annular flange 20 limits further downward movement of the outer coupling member relative to the inner coupling member. The annular surfaces 22 and 46 of the external flange and the connector section then extend divergently outwardly relative to each other from an annular line of support of the connector section on the upper surface 22 of the external flange 20 and the two coupling members may still pivot relative to each other about any axis extending perpendicularly to the longitudinal axis. The floating ring does not interfere with such pivotal movement since its radial width is such as to provide proper clearance between the floating ring and the spherical surfaces 21 and 36 and since, as the upper coupling member is pivoted, the floating ring tilts and its lowermost portions move downwardly of the lowermost edge of the external flange as the lower load member expands at the location of such lowermost portion of the floating ring. The portions of the ruptured upper load member which extend between and which may be bonded or adhesively secured to the various surfaces of the coupling members ordinarily will still seal between the two coupling members since such rupture is most apt to occur at the inner fold portion 51e of the upper load member. In addition if the load member 52 is still intact, it also seals between the inner and outer coupling members.

Conversely, if the lower load member fails and one coupling member is moved longitudinally away from the other coupling member, the members will be held against longitudinal movement relative to each other along an annular support line on the lower surface 23 of the extended flange at the annular inner edge portion of the collar section flange 32 and will be pivotable relative to each other due to the outward divergence of the annular surfaces 23 and 33 from such annular support line.

It will thus be apparent that the coupling will provide a fluid tight pivotal connection for the two flow conductors 11 and 12 even should either or both of the load members 51 and 52 rupture.

It will be apparent that only one load member need be provided or be full of liquid in order for the flexible coupling to operate properly and distribute the load imposed thereon uniformly on the bearing surfaces of the two coupling members provided that the load is exerted in the proper direction on the coupling member. For example, if the upper load member 51 is ruptured or removed from the coupling and the forces exerted on the flow conductor 11, tends to move it away from the other flow conductor 12, the lower load member 52 will function in the above described manner to uniformly distribute the load over the bearing surfaces of the two coupling members engaged thereby. Conversely, only the upper load member 51 need be provided or be full of liquid if forces are exerted on the flow conductors tending to move them longitudinally toward one another.

The principal function of the floating ring 95 is to maintain substantial concentricity of the coupling member and thus prevent lateral forces exerted between the coupling members from crushing the fold portions of the load members. If no lateral forces are exerted on the coupling members, the floating and support ring 95 may be omitted and the annular space between the outer tongue or fold portions 51b and 52b may be filled only with an incompressible liquid, such as grease or oil. The collar section may be provided with an inlet port 100 closable by a plug 101 threaded in its outer enlarged portion through which such incompressible liquid can be introduced into and expelled from such space whether or not the floating ring is employed. Such incompressible liquid may of course be introduced between the fold portions during assembly of the coupling if the inlet port is not provided.

It will now be seen that the new and improved coupling 10 for connecting adjacent ends of tubular members, such as the flow conductors 11 and 12, for limited pivotal movement relative to one another includes an inner tubular member 14 telescoped in an outer tubular member 15, that one of the coupling members is provided with an annular recess and the other with an annular flange which extend perpendicularly relative to the longitudinal central axis of the coupling, and that an annular hollow flexible load member containing an incompressible liquid is disposed between the inner and outer members and holds the two members spaced from one another to cause the liquid in the flexible load member to transmit and distribute uniformly to all surfaces contacted by the load member any load or forces exerted on the coupling members tending to move one member longitudinally relative to the other in a direction which places the liquid under pressure whereby the two coupling members are pivotally movable relative to one another by a minimum force exerted thereon.

It will further be seen that the coupling has an outer tubular member 15 provided with an internal recess 96 defined by longitudinal spaced lower and upper annular surfaces 33 and 46 and an internal surface 36 extending longitudinally between the annular surfaces, an inner member 14 disposed in the outer member whose external annular flange 20 extends to the annular recess, and a pair of annular hollow flexible members filled with an incompressible fluid disposed between the inner and outer members holding adjacent facing surfaces of the two coupling members spaced from one another.

It will also be seen that the longitudinal inwardly facing surfaces 34, 36 and 43 of the outer coupling member and the longitudinal outwardly facing surfaces 21, 24 and 25 of the inner coupling member engageable by the load members are spherical and have a common center of curvature located at the central longitudinal axis of the coupling.

It will further be seen that the load members permit pivotal movement of the coupling members relative to each other about any axis perpendicular to and intersecting the longitudinal central axis of the coupling at the common center of curvature of the spherical surfaces.

It will further be seen that the annular lower and upper surfaces 33 and 46 of the outer member extend divergently outwardly relative to the adjacent lower and upper annular surfaces 23 and 22 respectively of the external flange of the inner member whereby if a load member disposed between such adjacent annular surfaces fails, the outer coupling member is supported by the external flange along an annular line spaced inwardly of the outer end of the external flange whereby the outer coupling member is pivotable through the angle of divergence of such pair of adjacent annular surfaces of the two coupling members.

It will be further be seen that each of the load members has an inner annular upwardly extending tongue or fold portion which extends longitudinally in one direction between a pair of spaced spherical surfaces of the two coupling members and an outer annular tongue or fold portion spaced longitudinally and radially from its inner portion which extends in the opposite longitudinal direction between another pair of spaced spherical surfaces of the two coupling members whereby half portions of the flexible member on opposite sides of an axis may expand and contract to permit pivotal movement of the coupling members relative to one another about such axis while at the same time the compressible liquid in the load member transmits a load or force tending to move the coupling members longitudinally relative to each other uniformly to all load bearing surfaces of the two flexible members engaged by the load member.

It will now be apparent that a new and improved coupling has been illustrated and described which is easily and quickly assembled, which permits universal pivotal movement through a limited angle of the two coupling members relative to one another upon the exertion of a very small force regardless of the magnitude of the load imposed on the two coupling members tending to move them in opposite longitudinal directions relative to each other.

It will also be apparent that if desired, the locations of the recess and the external flange could be reversed, i.e., the inner coupling member could be provided with an external annular recess and the outer coupling member with an internal annular flange but the illustrated coupling is preferred because of the simplicity and small overall dimensions of its structure.

Figure 5:
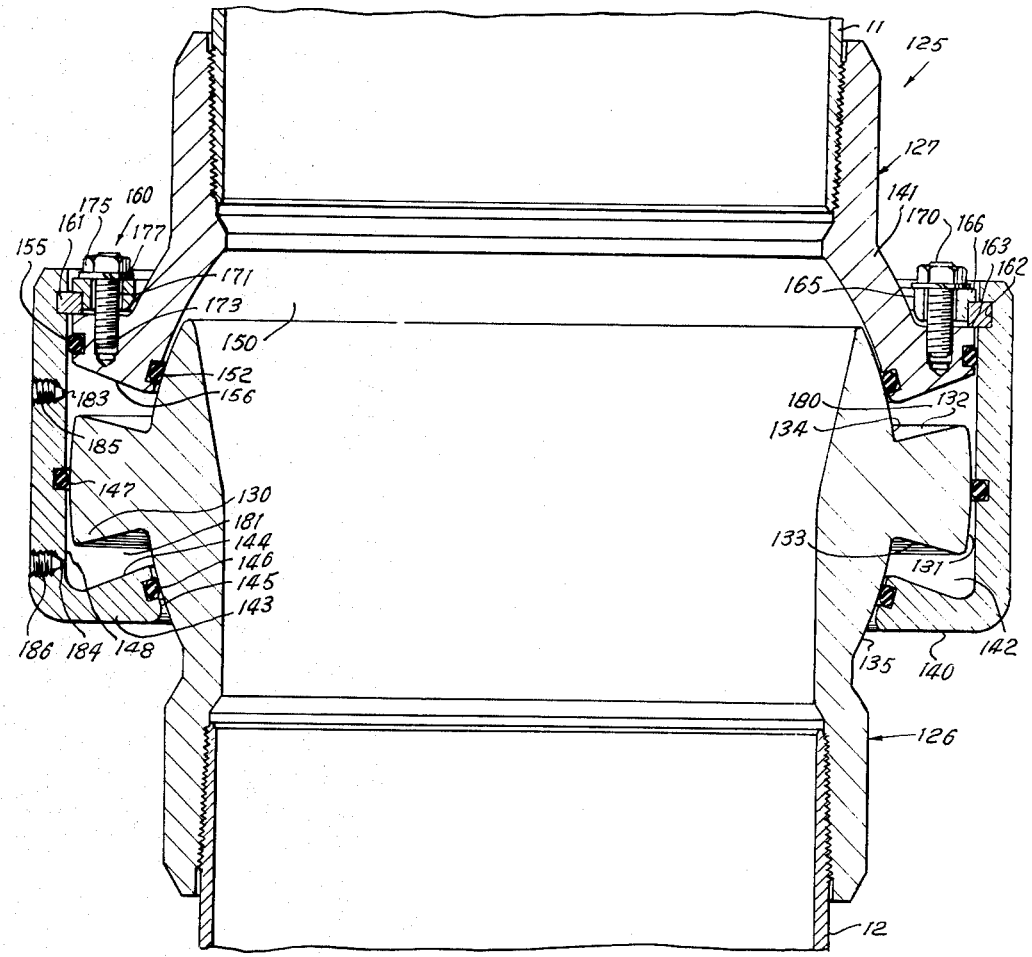

Referring now particularly to FIGURE 5 of the drawings, the flexible coupling 125 for connecting the adjacent ends of a pair of tubular members or flow conductors 11 and 12 includes a tubular inner member 126 secured to the flow conductor 12 and an outer tubular member 127 telescoped over the inner member and secured to the end of the tubular member 11. The inner coupling member has an external annular flange 130 whose outer arcuate surface 131 is spherical and whose upper and lower surfaces 132 and 133 diverge radially outwardly from the upper and lower spherical surfaces 134 and 135 of the inner member. The arcuate spherical surfaces 131, 134 and 135 have a common center of curvature located in the longitudinal central axis of the inner member. The radii of curvature of the surfaces 134 and 135 being equal while the radius of curvature of the surface 131 is greater than the radii of curvature of the surfaces 134 and 135.

The outer coupling member includes a collar section 140 and a coupling section 141 which provides an internal annular recess 142 into which extends the external flange 130 of the inner coupling member. The collar section has an internal annular bottom flange 143 whose top surface 144, when the coupling members are in their normal or axially aligned positions illustrated in FIGURE 5, extends upwardly and inwardly in spaced relation to the lower surface 133 of the external flange 130. The surfaces 133 and 144, like the surfaces 23 and 43 of the coupling 10, preferably extend divergently outwardly relative to each other. The inner annular surface 145 of the bottom flange 142 may be spherical and extends parallel and in spaced relation to the lower spherical surface 135 of the inner coupling member. An O-ring 146 disposed in a suitable internal recess of the flange 142 sealingly engages the lower spherical surface 135 of the inner coupling member and seals between the bottom flange of the collar section of the outer member and the lower spherical surface 135 of the inner coupling member.

The coupling section of the outer tubular member is also provided with an internal annular recess in which is disposed an O-ring 147 which engages the spherical outer surface 131 of the external flange 130 and seals between the flange and the internal surface 148 of the coupling.

The coupling section 141 has an internal spherical surface 150 which extends parallel to the external upper spherical surface 134 of the inner coupling member and has an internal annular recess in which is disposed an O-ring 152 which seals between the spherical surfaces 134 and coupling section 141. The surfaces 145 and 150 of the collar and coupling sections of the outer coupling member have the same common center curvature as the spherical surfaces of the inner coupling member so that the two coupling members may pivot in any direction through a limited angle about any axis extending perpendicular to and intersecting the longitudinal axis of the coupling at the location of the common center of the curvature of the spherical surfaces of the two coupling members.

The coupling section also has an O-ring 155 disposed in a suitable external annular recess of the coupling section which seals between the coupling section and the internal surface 149 of the collar section. The lower external surface 156 of the coupling section extends radially outwardly in spaced relationship to and divergently from the upper surface 132 of the external flange 131.

The coupling section is secured to the collar section by a retainer assembly 160 which includes a plurality of ring segments 161 whose outer portions are receivable in an internal annular recess 162 of the collar section and whose inner portions extend inwardly to engage the upper annular surface 163 of the coupling section. The ring segments are held in their outer locking positions by a retainer ring 165 having a lower portion which extends inwardly of the ring segments and has an external annular flange 166 whose bottom annular surface engages the upper surfaces of the ring segments. The ring segments and the lock ring are rigidly secured to the coupling section by a plurality of bolts 170 which extend through suitable circumferentially spaced apertures 171 of the lock ring into suitable upwardly opening threaded bores 173 of the coupling section. Nuts 175 are threaded on the upper ends of the bolts and lock washers 177 are interposed between the nuts and the upper surface of the lock ring.

It will be apparent that the coupling 125 is assembled by telescoping the inner coupling member into the collar section 140, positioning the coupling section in the collar section, inserting the ring segments 161 into the internal annular recess 162 of the collar section, inserting the lock ring downwardly and inwardly of the ring segments to the position illustrated in FIGURE 5, and then rigidly securing the lock ring and the ring segments to the coupling section by means of the bolts 172 and nuts 175. Fluid under pressure is introduced into the upper and lower annular chambers 180 and 181 provided by the two coupling members through the inlet ports 183 and 184 of the collar sections, respectively, which are closable by suitable plugs 185 and 186, respectively threaded in the outer enlarged portions of the ports.

It will be apparent that as one coupling member pivots relative to the other about the common center of curvature of the spherical surfaces of the two members, for example, to the right, FIGURE 5, the volume of the right one half portion of the chamber 180 decreases and simultaneously the volume of its left one half portion increases. Simultaneously the volume of the right one half portion of the lower annular chamber 181 increases while the volume of its left one half portion decreases. The incompressible fluid in the two chambers of course transmits all forces, whether of compression or tension, between the two coupling members equally to all load bearing surfaces of the two coupling members so that such pivotal movement of one member relative to the other may be accomplished with ease and with the exertion of a very small force.

It will now be apparent that the two couplings 10 and 125 each have outer and inner coupling members having means providing closed annular chambers disposed on opposite sides of an external annular flange of the inner coupling member, in the case of the coupling member 10 by the flexible load members 51 and 52 and in the case of the coupling 125 by the various seal means which seal between the adjoining surfaces of the inner and outer coupling members.

It will further be seen that each coupling member has an incompressible fluid confined in such closed chambers for transmitting the load forces between the two coupling members uniformly to all areas of the load bearing surfaces of the two coupling members.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A coupling including: an outer annular member; an inner annular member extending into said outer tubular member, one of said tubular members having an annular recess and the other of said members having an annular flange extending into said recess, said annular recess and said flange when said coupling members are in longitudinal alignment being disposed perpendicularly relative to and about the longitudinal axis of said coupling, said members having surfaces defining said recess and said flange spaced from one another; and an annular load member disposed between said inner member and said outer member engaging said spaced surfaces of said inner and outer members and holding said inner and outer members in spaced relation to one another and for pivotal movement relative to one another, said load member comprising an annular hollow member circumferentially elastic and cross-sectionally flexible and non-elastic, said load member being filled with an incompressible fluid, said load member transmitting forces between inner and outer members uniformly to all areas of the surfaces of said inner and outer members engaged by said load member.

2. A coupling comprising: an outer tubular member; an inner tubular member extending into said outer tubular member, one of said tubular members having an annular recess and the other of said members having an annular flange extending into said recess, said annular recess and said flange when said members are in longitudinal alignment being disposed perpendicularly relative to and about the longitudinal axis of said coupling; and a pair of deformable annular load members between said inner and outer members on opposite sides of said flange and engageable with said inner and outer members holding said members in spaced relation to one another for pivotal movement about axes extending perpendicularly relative to and intersecting the longitudinal axis of said coupling, each of said load members comprising a hollow annular member circumferentially elastic and cross-sectionally flexible and non-elastic and filled with an incompressible liquid, said load members transmitting uniformly forces between said inner and outer members to surfaces of said inner and outer members engaged by said load members.

3. A coupling including: an outer tubular member; an inner tubular member extending into said outer tubular member, one of said members having an annular recess providing longitudinally spaced annular facing surfaces and a first longitudinally extending spherical surface between said annular surfaces, said one of said members having annular spherical surfaces extending longitudinally in opposite directions from said annular surfaces, the other of said tubular members having an annular flange extending into said recess and having a longitudinally extending spherical surface spaced from said first spherical surface, said annular recess and said flange when said members are in longitudinal alignment being disposed perpendicularly relative to and about the longitudinal axis of said coupling, said other of said members having annular spherical surfaces extending longitudinally in opposite directions from said flange facing and spaced from said annular spherical surfaces, said spherical surfaces of said inner and outer members having a common center of curvature lying in the longitudinal central axis of said coupling; and a pair of deformable load members disposed between said inner and outer members on opposite sides of said flange between said annular surfaces and between said first spherical surface and said spherical surfaces of said other of said members, said load members having longitudinally and radially spaced annular inner and outer tongue portions extending in opposite longitudinal directions, said outer tongue portions extending toward each other between said spherical surface of said flange and said first spherical surface and said inner tongue portions extending in opposite directions between said annular spherical surfaces of said outer and inner members, said tongue portions being movable relative to the surfaces of said inner and outer members engaged thereby, said deformable members transmitting uniformly forces exerted on said inner and outer members to all areas of the surfaces of said inner and outer members engaged thereby, each of said load members comprising a hollow annular member cross-sectionally flexible and non-elastic and filled with an incompressible fluid.

4. A coupling including: an outer tubular member having internal annular recess providing longitudinally spaced annular facing surfaces and a first longitudinally extending spherical surface between said annular surfaces; an inner tubular member having an external annular flange extending into said recess and having an outer spherical surface spaced from said first spherical surface, said inner member having a pair of external annular spherical surfaces extending longitudinally in opposite directions from said external flange and said outer member having a pair of internal annular spherical surfaces extending longitudinally in opposite directions from said annular surfaces facing and spaced from said pair of spherical surfaces of said outer member, said spherical surfaces of said inner and outer members having a common center of curvature in the longitudinal central axis of said coupling when said inner and outer members are in longitudinal alignment; and a pair of deformable load members disposed between said inner and outer members on opposite sides of said external flange, each of said deformable load members comprising an annular closed chamber disposed between said inner member and said outer member and filled with an incompressible fluid and holding said inner and outer members in spaced relation to one another for pivotal movement relative to one another, each of said load members having a portion disposed between and engaging one of said annular surfaces of said outer member and one side of said external flange and between and engaging said first spherical surface and one of said spherical surfaces of said inner member, each of said load members having inner and outer annular tongue portions extending in opposite longitudinal directions, said inner tongue portions of said load members extending longitudinally in opposite directions between and engaging said annular spherical spaced surfaces of said inner and outer members, said outer tongue portions extending longitudinally toward each other between said first spherical surface of said outer member and said spherical surface of said external flange.

5. The coupling of claim 4, and means between said inner and outer members and between said outer tongue portions for holding said outer tongue portions spaced from one another.

6. A coupling including: an outer annular member; an inner annular member extending into said outer tubular member, one of said members having an annular recess and the other having an annular flange extending into said recess, said recess and said flange when said coupling members are in longitudinal alignment being disposed perpendicularly relative to and about the longitudinal axis of said coupling, said inner member having external load bearing surfaces spaced from adjacent internal load bearing surfaces of said outer member, said load bearing surfaces defining said recess and said flange, said coupling having means providing a pair of annular closed chambers disposed between said inner member and said outer member on opposite sides of said external flange and filled with an incompressible fluid holding said inner and outer members in spaced relation to one another for pivotal movement relative to one another.

7. The coupling of claim 6 wherein said means providing said annular chambers comprises seal means between said inner and outer members at opposite ends of said recess and seal means between said flange and an adjacent surface of said one of said members defining said recess.

References Cited by the Examiner
UNITED STATES PATENTS

| | | | |
|---|---|---|---|
| 1,402,645 | 1/1922 | Peress | 285—265 |
| 1,888,026 | 11/1932 | Chapman | 285—225 |
| 1,947,657 | 2/1934 | Peress | 285—261 |
| 2,422,158 | 6/1947 | Wolfram | 285—351 X |
| 2,428,143 | 9/1947 | Chavayda | 285—351 X |
| 2,724,602 | 11/1955 | Carey | 285—234 |
| 3,133,754 | 5/1964 | Peters | 285—264 X |

CARL W. TOMLIN, *Primary Examiner.*